Figure 1:
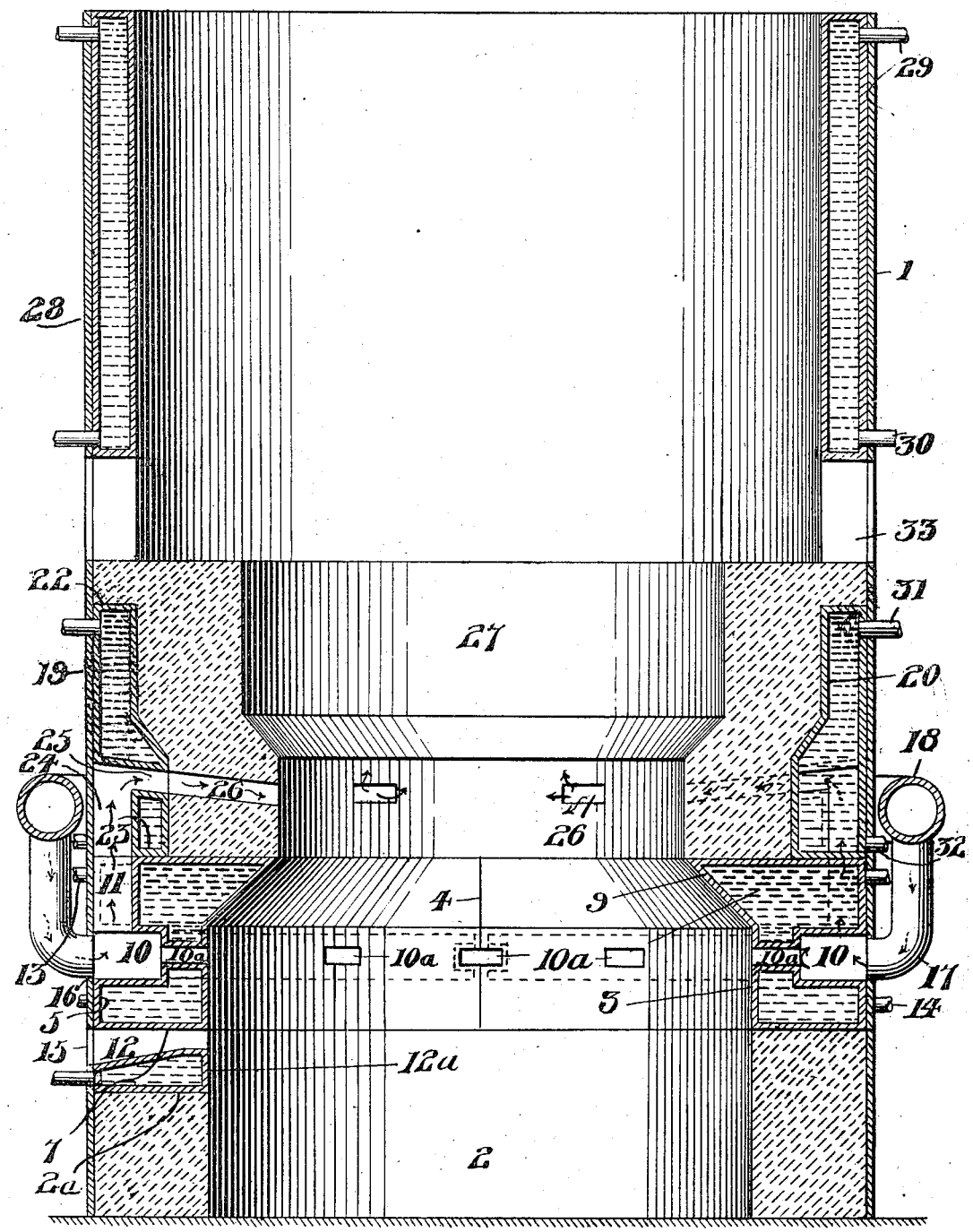

M. ZIPPLER, Jr.
CUPOLA FURNACE.
APPLICATION FILED APR. 6, 1912.

1,052,875.

Patented Feb. 11, 1913.
2 SHEETS—SHEET 1.

WITNESSES

INVENTOR
Michael Zippler, Jr.
BY
ATTORNEYS

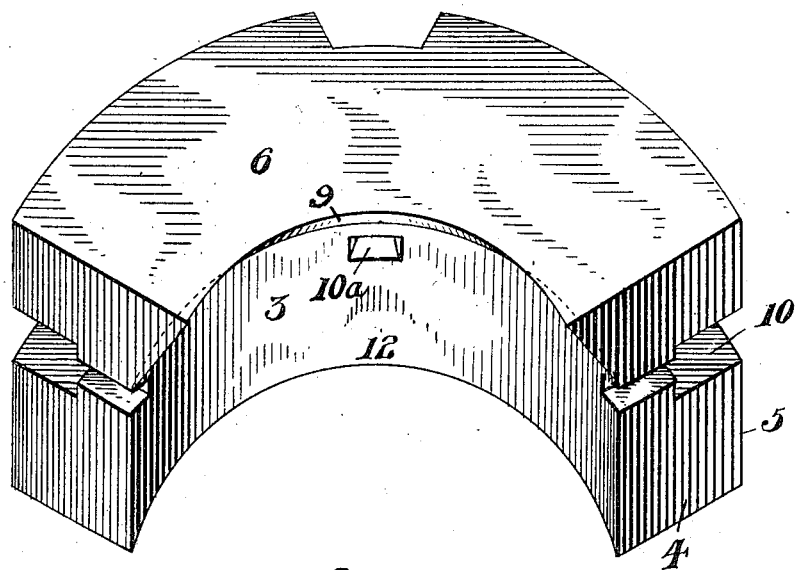
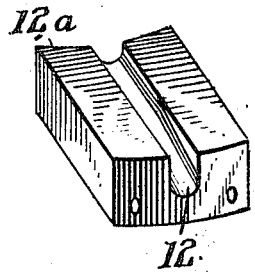
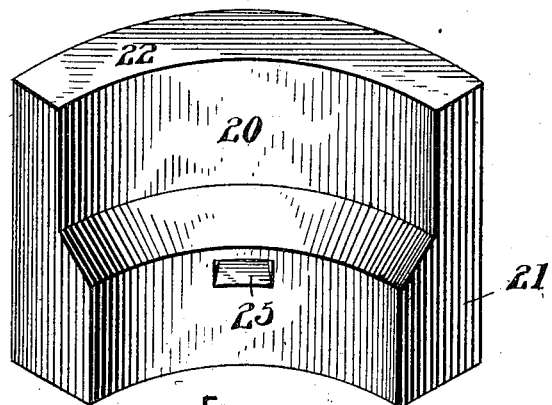
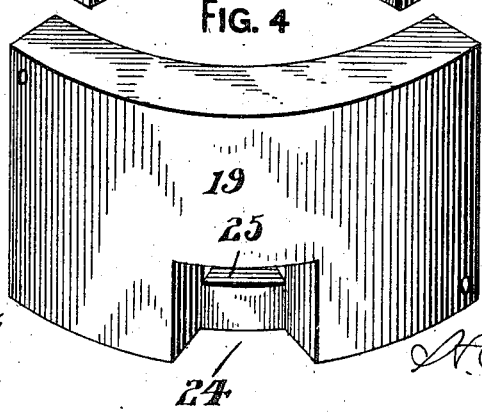

UNITED STATES PATENT OFFICE.

MICHAEL ZIPPLER, JR., OF PITTSBURGH, PENNSYLVANIA.

CUPOLA-FURNACE.

1,052,875.  Specification of Letters Patent.  Patented Feb. 11, 1913.

Application filed April 6, 1912. Serial No. 688,994.

*To all whom it may concern:*

Be it known that I, MICHAEL ZIPPLER, Jr., a citizen of the United States of America, residing at Pittsburgh, in the county of Allegheny and State of Pennsylvania, have invented certain new and useful Improvements in Cupola-Furnaces, of which the following is a specification, reference being had therein to the accompanying drawing.

This is an improvement on cupola-furnaces and the invention aims to provide a furnace of the above type that has an overhanging water cooled lining that is not liable to deteriorate as the ordinary lining of a cupola-furnace.

Another object of this invention is to provide a cupola furnace with twyers that can be kept clean, and consequently a better grade of product within the furnace. The twyers also insure a uniform heat and are disposed to blow the blast toward the center of the furnace with less pressure than heretofore required.

A further object of this invention is to furnish a cupola-furnace with water cooled slag holes that prevents the walls of the holes from being burned when the slag is removed.

A still further object of this invention is to provide a cupola-furnace structure that facilitates the melting of iron and the reduction of ores other than those of iron and increases the output of the furnace of the cupola type.

With the above and other objects in view, the invention resides in the novel construction, combination and arrangement of parts to be hereinafter specifically described and then claimed.

Reference will now be had to the drawings, wherein:—

Figure 1 is a vertical sectional view of the cupola-furnace, Fig. 2 is a perspective view of a section of a water cooled twyer plate in accordance with this invention, Figs. 3 and 4 are perspective views of a section of water jacket used in connection with the lining, and Fig. 5 is a perspective view of a water cooled slag casing.

The reference numeral 1 denotes a cylindrical metallic cupola shell ore casing and arranged in the bottom of said casing is a foundation ring 2 made of firebrick or a non-fusible material. The foundation ring 2 has a recess 2ᵃ in the top thereof and at one side. Arranged upon the foundation ring 2 is a water cooled overhang sectional hollow twyer plate, each section comprising an inner wall 3, end walls 4, an outer wall 5, a top plate 6 and a bottom plate 7 that rests upon the foundation ring 2. The walls and the plates are integral and provide a water reservoir or jacket. The top plate 6 is of a greater area than the bottom plate 7, said top plate projecting beyond the inner wall 3 and connected thereto by an inclined plate 9, said inclined plate coöperating with the top plate 6 in providing an annular supporting ledge, the purpose of which will hereinafter appear. The outer side of the sectional twyer plate has an annular air flue 10 and in communication with said flue are vertical passages 11, a passage being arranged intermediate the ends of each section of the twyer plate. One of the twyer plate sections rests upon a transverse casing 12ᵃ providing a slag opening 12, whereby slag can be removed from the furnace. The transverse casing 12ᵃ is seated in the recess 2ᵃ of the foundation ring.

The twyer plate sections just described are provided with a lower set of twyer openings 10ᵃ in communication with the annular air flue 10. The lower twyer openings 10ᵃ are intermediate the ends of the twyer plate sections and at the abutting edges of said sections, as best shown in Fig. 2.

The twyer plate sections have water inlet pipes 13 and water outlet pipes 14, said pipes extending through the casing 1. The casing 1 has openings 15 communicating with the slag opening, and openings 16 in communication with the air flue 10. In the openings 16 are arranged air supply pipes 17 that are connected to an annular pipe 18.

Arranged upon the water cooled sectional twyer plate is a sectional water jacket, each section comprising an outer wall 19 that is arranged against the casing 1. Besides the outer wall 19, there is an inner stepped wall 20, end walls 21, a top plate 22 and a bottom plate 23. The bottom plate 23 rests upon the top plates 6 of the twyer plate sections and the water jacket has a vertical air passage 24 in communication with the vertical air passage 11 of a twyer plate section. The air passage 24 is in communication with an inlet opening 25 that communicates with an upper set of angularly disposed twyer openings 26 in a lining 27 that is mounted upon the supporting ledge of the water cooled overhang hollow twyer plate. The lining 27 is made of fire-brick or other non-fusible material and said lining overhangs the bottom part of the furnace by reason of the annular supporting ledge of the lower water jacket.

Arranged upon the top of the lining 27 is a cylindrical water jacket 28 and this water jacket has water inlet pipes 29 and water outlet pipes 30, while the upper sectional water jacket has water inlet pipes 31 and water outlet pipes 32.

The casing 1 and the water jacket 28 have registering openings 33 that permit of the furnace being charged.

With a continuous circulation of water in the lower and upper water jackets, the liability of the lower part of the furnace being burned out is reduced to a minimum, consequently the life of the furnace is materially increased and by reason of its novel construction, a larger output of a higher quality of metal is obtained.

While in the drawings there is illustrated a preferred embodiment of the invention, it is to be understood that the structural elements thereof are susceptible to such variations as fall within the scope of the appended claims.

What I claim is:—

1. In a cupola-furnace a water cooled overhang sectional hollow twyer plate, each of the sections of said twyer plate being segment-shaped and having each end formed with a transverse groove and its outer face with an air passage extending from one groove to the other, the upper portion of the inner face of each of said sections extending upwardly and inwardly at an inclination, the grooves and the passage of one section registering with the grooves and passage of the other section and means for supplying and discharging a cooling medium to and from each of the sections.

2. A cupola-furnace comprising a shell, a bosh lining having a portion of its length spaced from said shell and its remaining portion abutting against the inner face of the shell, a sectional water jacket interposed between said bosh lining and said shell, said bosh lining provided with openings, said jacket provided with means to constitute air passages communicating with said openings, said jacket further provided with means to constitute channels for conducting air to said openings, means for supplying air to said channels, and means carried by said jacket and projecting through said shell for supplying and discharging water to and from said jacket, said shell constituting one of the walls of said channels.

3. A cupola furnace comprising a shell, a cylindrical water jacket positioned within and abutting against the inner face of the upper portion of the shell, said cylindrical water jacket and shell provided with means to constitute charging openings, supporting means within the shell for said water jacket, and means communicating with the water jacket and projecting through the shell for supplying and discharging a cooling medium to and from the water jacket.

4. A cupola furnace comprising a shell, a foundation ring within said shell, a water cooled hollow casing mounted in the top of said foundation ring at one side thereof and having its upper portion depressed to provide a groove inclining outwardly to constitute a discharge opening, and a water cooled overhang hollow twyer plate mounted upon the ring and abutting against the shell and having its bottom forming the top wall of said discharge opening.

In testimony whereof I affix my signature in the presence of two witnesses.

MICHAEL ZIPPLER, Jr.

Witnesses:
 Max H. Srolovitz,
 J. P. Appleman.

---

Copies of this patent may be obtained for five cents each, by addressing the "Commissioner of Patents, Washington, D. C."